US 012076769B2

(12) United States Patent
Magne et al.

(10) Patent No.: US 12,076,769 B2
(45) Date of Patent: Sep. 3, 2024

(54) FLATNESS ROLLER, SYSTEM FOR MEASURING FLATNESS AND LINE FOR ASSOCIATED ROLLING OPERATIONS

(71) Applicants: COMMISSARIAT A L'ENERGIE ATOMIQUE ET AUX ENERGIES ALTERNATIVES, Paris (FR); ArcelorMittal, Luxembourg (LU)

(72) Inventors: Sylvain Magne, Chatillon (FR); Nicolas Legrand, Chicago, IL (US)

(73) Assignees: COMMISSARIAT A L'ENERGIE ATOMIQUE ET AUX ENERGIES ALTERNATIVES, Paris (FR); ArcelorMittal, Luxembourg (LU)

( * ) Notice: Subject to any disclaimer, the term of this patent is extended or adjusted under 35 U.S.C. 154(b) by 1017 days.

(21) Appl. No.: 16/971,597

(22) PCT Filed: Feb. 19, 2019

(86) PCT No.: PCT/FR2019/050368
§ 371 (c)(1),
(2) Date: Aug. 20, 2020

(87) PCT Pub. No.: WO2019/162606
PCT Pub. Date: Aug. 29, 2019

(65) Prior Publication Data
US 2021/0078060 A1    Mar. 18, 2021

(30) Foreign Application Priority Data
Feb. 22, 2018   (FR) .................................... 18 51553

(51) Int. Cl.
*B21B 38/02*     (2006.01)
*B21B 1/24*      (2006.01)
(Continued)

(52) U.S. Cl.
CPC .............. *B21B 38/02* (2013.01); *B21B 1/24* (2013.01); *G01B 11/26* (2013.01); *G01B 11/306* (2013.01); *G01L 1/246* (2013.01)

(58) Field of Classification Search
CPC ..... B21B 38/02; B21B 2263/04; G01B 11/18; G01B 11/26; G01B 11/306; G01B 7/34;
(Continued)

(56) References Cited

U.S. PATENT DOCUMENTS 4,356,714 A     11/1982  Quehen
5,285,684 A  *   2/1994  Uesugi .................... B21B 38/02
                                                    73/159
(Continued)

FOREIGN PATENT DOCUMENTS

DE   10 2008 030 282 B3   10/2009
EP       0 028 191 A1      5/1981
(Continued)

OTHER PUBLICATIONS

Merriam-Webster, 'Escutcheon', https://www.merriam-webster.com/dictionary/escutcheon (Year: 2023).*
(Continued)

*Primary Examiner* — Bobby Yeonjin Kim
*Assistant Examiner* — Jared O Brown
(74) *Attorney, Agent, or Firm* — Oblon, McClelland, Maier & Neustadt, L.L.P.

(57) ABSTRACT

A flatness roller includes a body having at least one cavity opening onto an outer surface of the body through a plurality of slots, two successive slots defining a lamella between them, each lamella being connected to the body by two connection portions. The flatness roller also includes at least one optical fibre having at least one strain sensor having a measurement axis. Each strain sensor is housed in a cavity and attached at a connection portion of a lamella, the
(Continued)

measurement axis forming an angle less than or equal to 20° with a plane orthogonal to the axis of revolution of the body. Each strain sensor is configured to send an optical response wave representative of a strain of the strain sensor according to the measurement axis thereof.

14 Claims, 7 Drawing Sheets (51) Int. Cl.
*G01B 11/26* (2006.01)
*G01B 11/30* (2006.01)
*G01L 1/24* (2006.01)

(58) Field of Classification Search
CPC ........ G01B 7/345; G01B 21/30; G01B 13/22; G01B 17/08; G01B 5/28; G01L 1/246; G01L 5/0004; G01L 5/04; G01L 5/045; G01L 5/105; G01L 1/242; G01L 11/025; B21C 51/00
See application file for complete search history.

(56) References Cited

U.S. PATENT DOCUMENTS

| 5,629,487 | A | 5/1997 | Muecke et al. | |
| 7,357,022 | B2* | 4/2008 | Noe | B21B 38/02 73/159 |
| 8,814,076 | B2* | 8/2014 | Ingvarsson | G01L 5/045 242/413.3 |
| 9,440,270 | B2* | 9/2016 | Thiel | B21B 38/08 |
| 9,784,574 | B2* | 10/2017 | Noe | B21B 38/02 |
| 2005/0285059 | A1* | 12/2005 | Gerber | G01L 5/105 250/559.45 |
| 2009/0320616 | A1 | 12/2009 | Noe | |
| 2016/0109231 | A1 | 4/2016 | Noe et al. | |

FOREIGN PATENT DOCUMENTS

| EP | 0241280 A2 * | 10/1987 | ........... B21B 38/006 |
| EP | 0 595 072 A1 | 5/1994 | |
| EP | 0 940 662 A1 | 9/1999 | |
| EP | 1752231 A2 * | 2/2007 | ........... B21B 38/006 |
| EP | 3 009 206 A1 | 4/2016 | |
| WO | WO-02070155 A1 * | 9/2002 | ............. B21B 38/02 |

OTHER PUBLICATIONS

Google Images, 'Escutcheon', https://www.google.com/search?sca_esv=590900121&rlz=1C1GCEB_enUS785US786&q=escutcheon&tbm=isch&source=lnms&sa=X&sqi=2&ved=2ahUKEwiawcH-j4-DAxU-MVkFHSLkD94Q0pQJegQICRAB&biw=1200&bih=1771&dpr=1 (Year: 2023).*
U.S. Pat. No. 7,703,331 B2, Apr. 27, 2010, Magne et al.
U.S. Appl. No. 10/592,571, filed Mar. 24, 2008, US 2008/0204706 A1, Magne et al.
U.S. Pat. No. 9,664,609 B2, May 30, 2017, Magne et al.
U.S. Pat. No. 10,048,388 B2, Aug. 14, 2018, Magney et al.
International Search Report and Written Opinion (with English translation of Categories of Cited Documents) issued on Apr. 15, 2019 in PCT/FR2019/050368 filed on Feb. 19, 2019, 13 pages.
Preliminary French Search Report (with English translation of Categories of Cited Documents) issued on Oct. 9, 2018 in French Application No. 1851553 filed on Feb. 22, 2018, 2 pages.

* cited by examiner

FLATNESS ROLLER, SYSTEM FOR MEASURING FLATNESS AND LINE FOR ASSOCIATED ROLLING OPERATIONS

TECHNICAL FIELD

The present invention relates to a flatness roller including a cylindrical body extending along an axis of revolution and delimited radially by an outer surface.

The invention also relates to a system for measuring flatness comprising such a flatness roller, and a rolling operation line including such a system for measuring flatness.

The invention applies to the field of rolling, in particular the rolling of metal sheets such as thin metal sheets, particularly the cold rolling of thin metal sheets. The invention also applies to the rolling of paper or plastic strips.

PRIOR ART

It is known to use rolling for producing metal sheets of low thickness (typically in the order of 0.1 mm to 1 mm), known as "thin sheets".

For example, in the field of packaging, the use of such thin sheets is intended to reduce the volume of waste to be recycled. In the field of transport, the use of thin sheets is motivated by a willingness to reduce manufacturing costs, but also to reduce the weight of vehicles, which results in a reduction in the fuel consumption and pollution of said vehicles.

Figure 1:
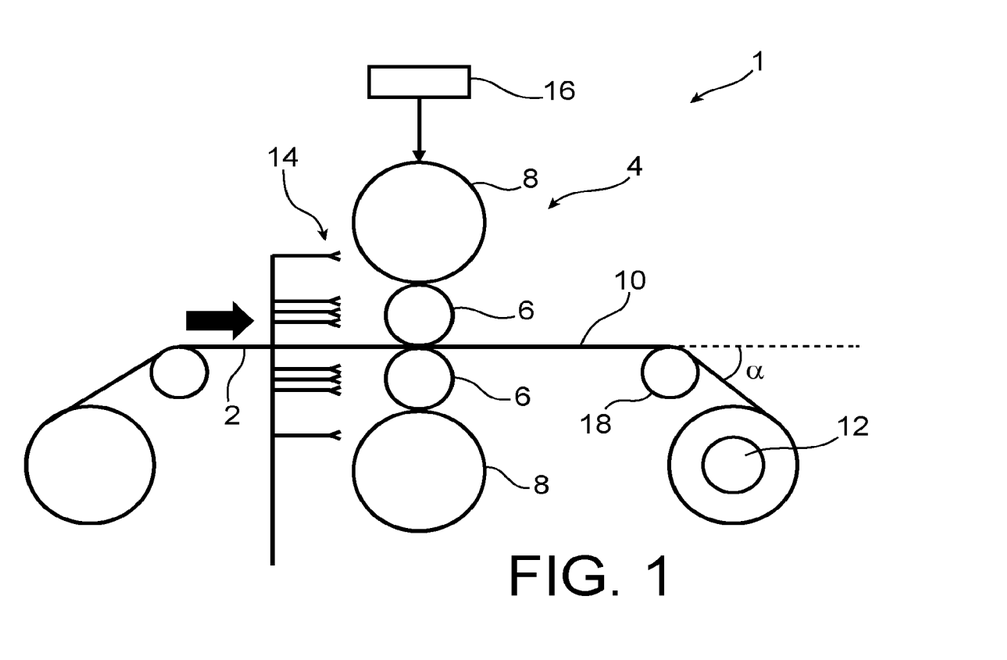
FIG. 1, already described, is a schematic side view of a rolling operation line.

A conventional rolling operation line 1 is schematically illustrated in FIG. 1.

On such a rolling operation line 1, a material 2 is transported, following the direction of the arrow, towards a rolling mill stand 4. The material is, for example, a metal, paper pulp or plastic. In the rolling mill stand 4, the material 2 is compressed between two working rollers 6 in rotation and separated by a distance called "roll gap". The working rollers 6 are themselves taken between two back-up rollers 8. The sheet 10 output from the rolling mill stand 4, also called "strip", is then wound as a result of a winder 12.

It is known that rolling, particularly the rolling of thin sheets, generally favours the appearance of flatness defects of the sheet 10 output from the rolling mill stand 4. Such defects mainly arise from a relaxation of internal stresses due to an inhomogeneity of the forces applied by the working rollers 6, resulting in an irregularity of the gap in an axial direction of the working rollers 6, caused by elastic bending and flattening strains of the working rollers 6. Such defects generally result from elastic bending and flattening strains of the working rollers of the rolling mill stand. Such strains of the rollers of the rolling mill stand are all the more critical if the product is thin and hard. The flatness of a rolled sheet constitutes a fundamental criterion of quality of the geometry of a rolled sheet.

It is known to implement a method for controlling on line the rolling operations, during which data from a system for measuring flatness output from the rolling mill stand 4 is implemented, in a control loop, for controlling nozzles 14 intended to locally spray the rollers 6, 8 of the rolling mill stand 4 for locally modifying thereof the state of strain, or even for controlling actuators 16 intended to act on the rollers 6, 8 of the rolling mill stand 4 for modifying thereof the bending, and modifying thereof the distribution of force in the material 2 during rolling.

The system for measuring flatness includes, for example, a flatness roller 18.

Such a flatness roller 18 is a roller extending parallel to the working rollers 6, arranged at the exit of the rolling mill stand 4, and against which the sheet 10 is deliberately placed in contact and bending according to an angle α, known as "tensioning angle", in order to generate on the flatness roller 18, via a tensile stress on the sheet, an average force of controlled value.

Sensors equipping the flatness roller 18 then measure a force profile applied by the strip 10 on the surface of the flatness roller 18, and more specifically along a "generatrix", which is a portion of the surface of the flatness roller 18 elongated along an axis parallel to the axis of the flatness roller 18.

The distribution of the differential forces on the generatrix, in relation to an average force, is representative of the flatness of the sheet 10. Such a distribution, called "flatness vector", constitutes the data implemented in the control loop previously described.

Nevertheless, the flatness rollers of the prior art do not provide complete satisfaction.

Indeed, in the case of thin sheets, the flatness rollers of the prior art generally have a spatial resolution along each generatrix, a sensitivity, that is to say a force resolution, a dynamic and a bandwidth that are insufficient for providing a flatness vector that is sufficiently accurate for guaranteeing an effective control by regulation of the rolling operation line 1.

Furthermore, the manufacturing and maintenance of such flatness rollers are generally expensive.

Therefore, one aim of the invention is to propose a flatness roller that does not have some at least of said drawbacks.

DESCRIPTION OF THE INVENTION

To this end, the aim of the invention is a flatness roller of the aforementioned type, wherein the body includes at least one cavity extending parallel to the axis of revolution, each cavity opening radially onto the outer surface through a plurality of slots each extending in a respective plane orthogonal to the axis of revolution, of which two successive slots along an axis parallel to the axis of revolution mutually defining a lamella between them, each lamella being connected to the body by two opposite circumferential ends of the lamella, each circumferential end forming a connection portion, the lamellas aligned in a direction parallel to the axis of revolution forming a generatrix, the flatness roller including, furthermore, at least one optical fibre comprising at least one strain sensor, each strain sensor having a measurement axis, each strain sensor being associated with a lamella, each strain sensor being housed in a corresponding cavity and attached to the corresponding lamella at a connection portion of the lamella, each strain sensor being arranged so that the angle between the corresponding measurement axis and a plane orthogonal to the axis of revolution X-X is less than or equal to 20°, preferably less than or equal to 10°, each optical fibre being configured to receive an interrogation signal, each strain sensor of each optical fibre being configured to send, depending on the interrogation signal received by the corresponding optical fibre, an optical response wave representative of a strain of the strain sensor along the corresponding measurement axis.

Indeed, the lamellas being separated by slots, the effects of cross-talk between lamellas are significantly reduced in relation to the case where said lamellas would not be separated in the longitudinal direction.

Furthermore, for a given lamella, the connection portions constituting the areas of the lamella that have the greatest orthoradial strain values for a given radial force applied on the lamella, the arrangement of each strain sensor at a connection portion of the lamella is the arrangement that gives the greatest sensitivity for the orthoradial strain measurement.

Furthermore, the use of a plurality of sensors arranged on the same optical fibre allows a simultaneous strain plotting for each lamella along a generatrix of the flatness roller.

Furthermore, the fact that each strain sensor is arranged so that the angle between the corresponding measurement axis and a plane orthogonal to the axis of revolution X-X is less than or equal to 20°, preferably less than or equal to 10, results in a greater strain of the strain sensor than in the case where the strain sensor would be arranged at a greater angle, which improves the sensitivity.

Such features give a sufficient sensitivity for achieving the required performances in terms of detection of strain gradient in the strip, typically 50 microstrains for very thin strip thicknesses (in the order of 0.1 mm).

According to other advantageous aspects of the invention, the flatness roller includes one or more of the following features, taken individually or according to all technically possible combinations:
- at least one lamella has a constant thickness;
- at least one cavity has, in a plane orthogonal to the axis of revolution, a circular section;
- each lamella is configured to have a circumferential strain between 1 and 50 microstrains per newton of radial force applied to the lamella;
- each generatrix has a variable density of slots, the density of slots in at least one peripheral area of the generatrix being, preferably, greater than the density of slots in the intermediate area of the generatrix;
- the body consists of a plurality of sections arranged axially end to end, each section being associated to at least one specific optical fibre whereof all of the strain sensors are attached to the lamellas of said section;
- the body includes at least one solid portion arranged radially inwardly in relation to at least one cavity and/or circumferentially between two cavities;
- each cavity is filled with an elastomer arranged to provide a sealing of the cavity;
- the flatness roller includes at least one transparent portion, the transparent portion being suitable for transmitting at least partially one electromagnetic wave belonging to a predetermined range of frequencies;
- each strain sensor is a fibre Bragg grating.

Furthermore, the aim of the invention is a system for measuring flatness including a flatness roller such as defined above and a detection unit, the detection unit being configured to send the interrogation signal to each optical fibre and to receive, coming from each optical fibre, a measurement signal formed by the optical response waves generated by the strain sensors of the optical fibre, the detection unit also being configured to measure an angle of rotation of the body in relation to a reference position, each generatrix being associated with a contact angle, the detection unit being configured to acquire the measurement signal coming from each optical fibre when the angle of rotation of the body is equal to the contact angle, the detection unit being, furthermore, configured to calculate a flatness vector depending on each acquired measurement signal.

According to other advantageous aspects of the invention, the system for measuring flatness includes one or more of the following features, taken individually or according to all technically possible combinations:
- each generatrix is also associated with an entry contact angle and an exit contact angle, the contact angle being between the entry contact angle and the exit contact angle, the detection unit being configured to acquire the measurement signal coming from each optical fibre when the angle of rotation of the body is equal to each of the entry contact angle and the exit contact angle, the detection unit being, furthermore, configured to implement the measurement signal acquired for each of the entry contact angle, the contact angle and the exit contact angle in order to calculate the flatness vector corrected with effects of the temperature on the lamellas of the generatrix during the rotation of the body between the corresponding entry contact angle and the exit contact angle;
- the body of the flatness roller is metal and includes a central recess, the processing unit being at least partially housed in the central recess.

Furthermore, the aim of the invention is a rolling operation line including a system for measuring flatness such as defined above.

BRIEF DESCRIPTION OF THE DRAWINGS

The invention will be better understood using the following description, given by way of non-limiting example and made in reference to the appended drawings, wherein.

DETAILED DESCRIPTION OF SPECIFIC EMBODIMENTS

Figure 2:
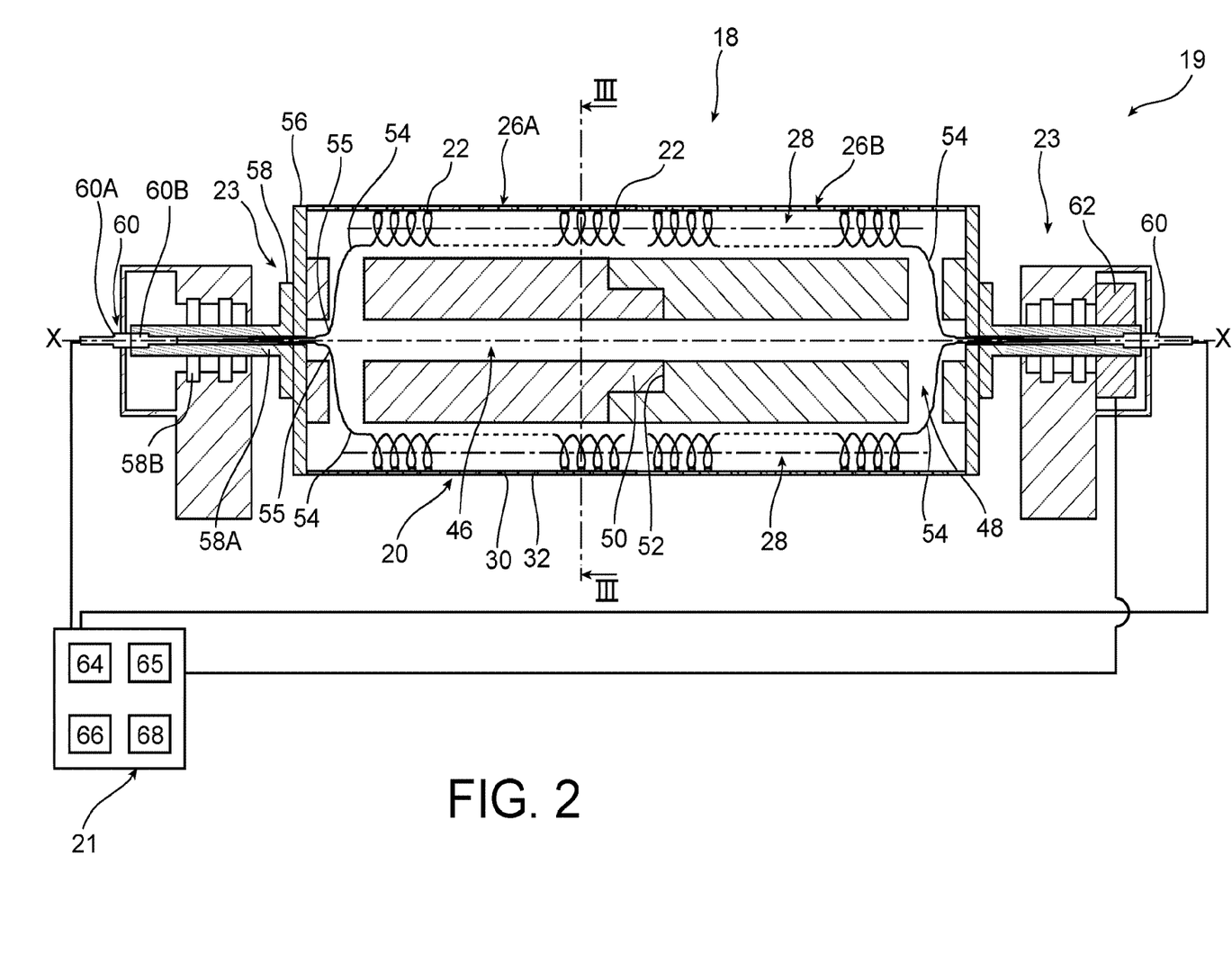
FIG. 2 is a schematic representation of a first embodiment of a system for measuring flatness according to the invention, a flatness roller of the system for measuring flatness being shown in a sectional view along a plane containing an axis of revolution of the flatness roller.

A system for measuring flatness 19 according to the invention is illustrated in FIG. 2.

The system for measuring flatness 19 includes a flatness roller 18 and a detection unit 21.

The flatness roller 18 is intended to receive the metal sheet 10 (or strip of paper or of plastic) whereof the flatness must be measured, and to deliver at least one measurement signal representative of the flatness of the sheet 10.

The detection unit 21 is configured to receive each measurement signal and to determine, from the measurement signal, at least one variable relative to the flatness of the sheet 10.

The flatness roller 18 comprises a body 20, sensors 22 and two end devices 23.

The body 20 is intended to come into contact with the sheet 10 in order to be subjected to a force exerted by the sheet 10 on the body 20, when the flatness roller 18 operates within the rolling operation line 1.

The sensors 22 are configured to measure a variable representative of the force exerted by the sheet 10 on the body 20. As will be subsequently described, the sensors 22 are strain sensors.

The end devices 23 are, inter alia, intended to support the body 20.

The body 20 will now be described with reference to FIGS. 2 to 5.

The body 20 has the shape of a cylinder of revolution extending along an axis of revolution X-X. As will be subsequently described, the axis of revolution X-X is also an axis of rotation of the flatness roller 18.

The body 20 is delimited radially by an outer surface 24.

The body 20 is produced in one piece, or even consists of a plurality of mutually connected sections and arranged axially end to end.

In the example in FIG. 2, the roller 20 consists of a first cylindrical section 26A integral with a second cylindrical section 26B, each having the axis of revolution X-X as specific axis of revolution.

Figure 3:
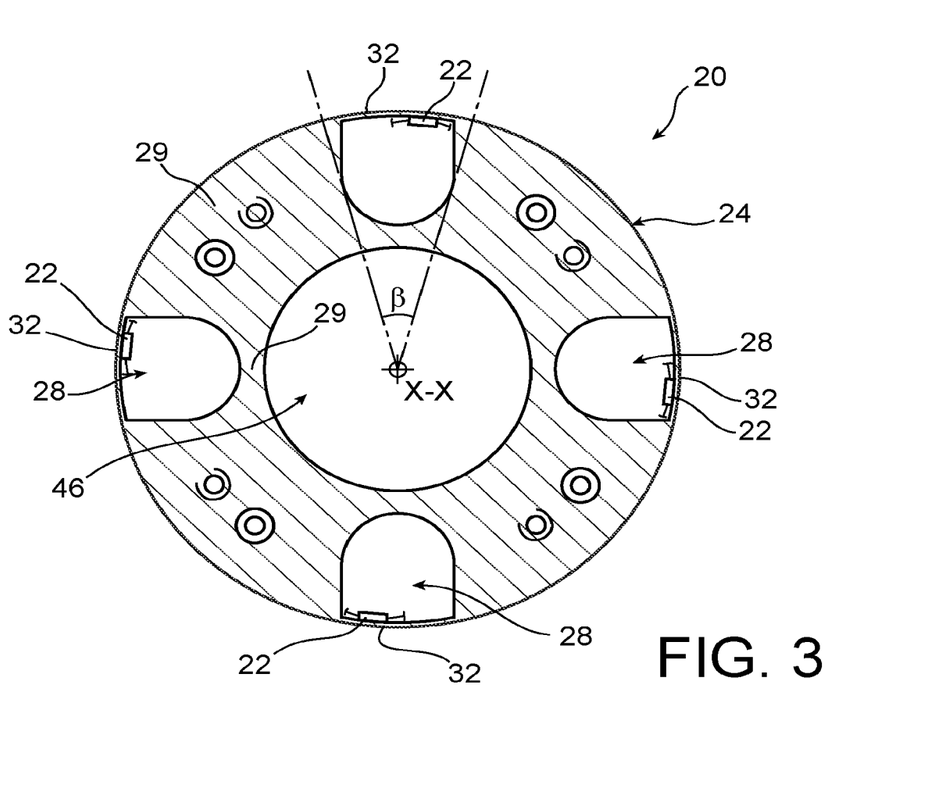
FIG. 3 is a sectional view of the flatness roller of FIG. 2, in a plane orthogonal to the axis of revolution.

The body 20 comprises at least one cavity 28 and, for each cavity 28, a plurality of corresponding slots 30 and a plurality of corresponding lamellas 32. Furthermore, the body 20 includes solid portions 29 arranged radially inwardly in relation to the cavities 28 and/or circumferentially between the cavities 28.

Each cavity 28 is provided in the body 20 and opens onto the outer surface 24 by the plurality of corresponding slots 30. Furthermore, each lamella 32 is defined between, that is to say delimited by, two slots 30 that are successive along a direction parallel to the axis of revolution X-X.

Each cavity 28 extends along a respective axis parallel to the axis of revolution X-X.

For example, the body 20 includes four cavities 28 offset from one another in the circumferential direction of the body 20 and each extending along a respective axis parallel to the axis of revolution X-X.

Advantageously, the cavities 28 are arranged so that the centre of gravity of the body 20 is located on the axis of revolution X-X, so that the flatness roller 18 is not out of balance during the rotation thereof about the axis of revolution X-X. For example, the body 20 is invariant by a predetermined angle of rotation about the axis of revolution X-X. In this case, the cavities 28 are also invariant by said predetermined angle of rotation about the axis of revolution X-X.

In the example in FIG. 3, the body 20 is invariant by a rotation of 90° (degrees) about the axis of revolution X-X.

Preferably, each cavity 28 is such that, in at least one transverse plane III-III that is a plane orthogonal to the axis of revolution X-X, the cavity 28 has an angular extension β, with reference to the axis of revolution X-X, which is less than 180°, preferably less than 120°, for example less than 90°.

"Angular extension of the cavity 28" means, within the meaning of the present invention, the angle of the smallest angular sector formed from the axis of revolution X-X and encompassing the entire cavity 28. In other words, this is the angular sector whereof the two segments are tangent to the cavity 28.

For example, each cavity 28 has an angular extension β that is approximately 40°.

Each cavity 28 opens radially onto the outer surface 24 through the plurality of corresponding slots 30.

Figure 4:
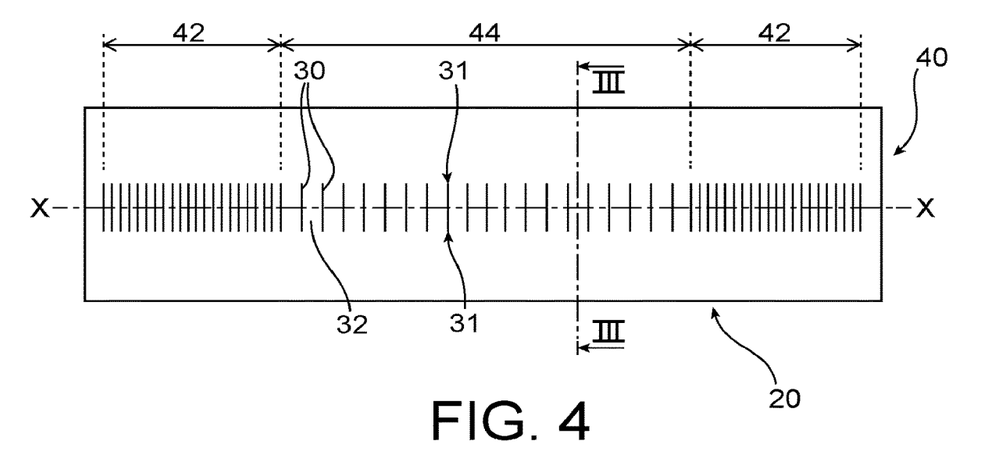
FIG. 4 is a top view of a body of the flatness roller of FIG. 2, showing a generatrix of the flatness roller.

Each slot 30 extends in a respective plane orthogonal to the axis of revolution X-X. Each slot 30 has two circumferential slot ends 31.

Preferably, two successive slots 30 along an axis parallel to the axis of revolution X-X are separated by a distance less than or equal to 50 mm, advantageously less than or equal to 25 mm, for example less than or equal to 5 mm.

Preferably, the slots 30 are identical.

Figure 5:
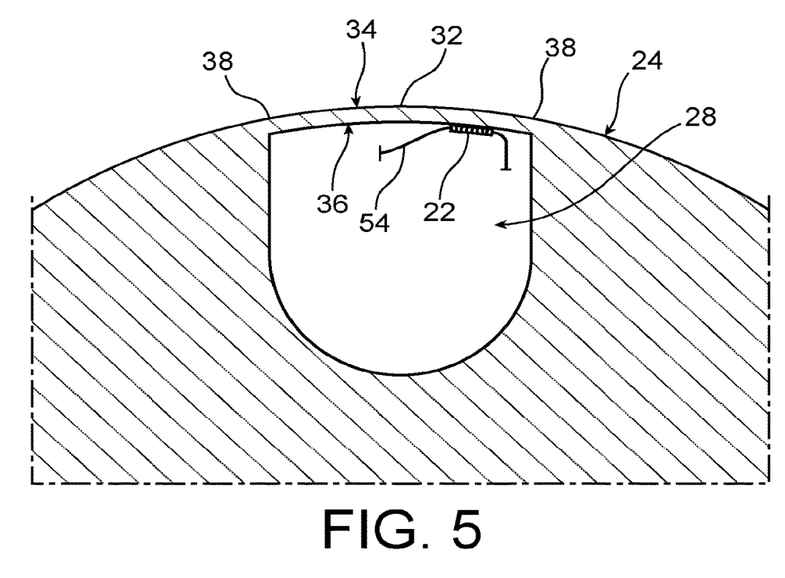
FIG. 5 is a detail of the sectional view of FIG. 3.

Each lamella 32 is axially defined between two successive slots 30 along an axis parallel to the axis of revolution X-X. Furthermore, each lamella 32 is radially defined between the outer surface 24 and the corresponding cavity 28.

Each lamella 32 comprises an outer face 34, an inner face 36 and two opposite circumferential ends 38.

The outer face 34 is defined as a portion of the outer surface 24 of the body 20. The outer face 34 is convex.

The inner face 36 is oriented opposite the outer face 34. The inner face 36 thus contributes to delimiting the cavity 28 corresponding to the lamella 32.

Preferably, the inner face 36 is concave.

Furthermore, each lamella 32 is connected to the body 20 by the two circumferential ends 38 thereof, which are defined in the axial alignment, that is to say the alignment along an axis parallel to the axis of revolution X-X, of the circumferential slot ends 31 of the two slots delimiting said lamella 32.

The circumferential ends 38 are also called "connection portions".

For example, each lamella 32 is integral with the body 20. Alternatively, each lamella 32 is connected and is attached to the body 20 by means of the circumferential ends 38 thereof.

Advantageously, each lamella 32 has a constant thickness.

"Thickness" of a lamella 32, means, within the meaning of the present invention, the radial distance between the inner face 36 and the outer face 34 of the lamella 32 in relation to the axis of revolution X-X.

The thickness of the lamellas 32 is less than or equal to a predetermined thickness. The predetermined thickness is, in particular, chosen depending on mechanical properties of the sheet 10 whereof the flatness defects are to be measured, as well as a sought force sensitivity.

The predetermined thickness is, preferably, less than or equal to 10 mm, advantageously less than 5 mm, for example less than or equal to 2 mm.

For example, in the case of a biconvex section cavity 28, in particular an escutcheon section as in FIG. 5, the lamella 32 has a constant thickness.

"Biconvex section cavity" means, within the meaning of the present invention, a cavity 28 such that the intersection of a transverse plane with the cavity 28 defines a biconvex periphery, in this case convex at the time when the cavity is seen from an outer radial side, that is to say further away from the axis X-X than the cavity, and when the cavity is seen from an inner radial side, that is to say closer to the axis X-X than the cavity.

Figure 9:
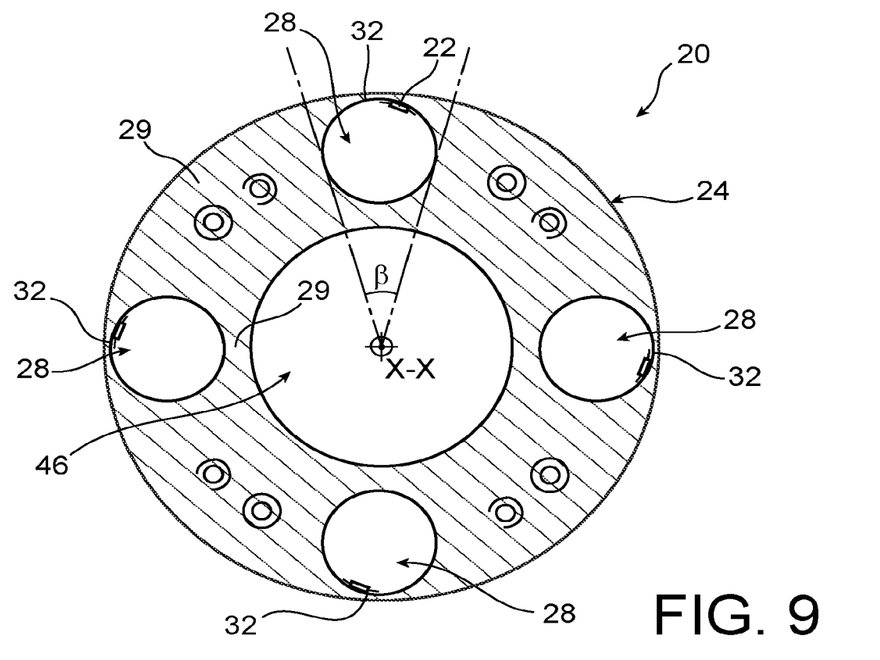
FIG. 9 is a sectional view of a variant of the flatness roller of FIG. 2, in a plane orthogonal to the axis of revolution.

According to another example, the cavity 28 has a circular section, as illustrated in FIG. 9.

In this case, for each lamella 32, the connection portions 38 correspond to the two portions of the lamella 32 that are located in two angular positions located on either side of a median portion of the lamella 32, with reference to the axis of revolution X-X and for which the lamella 32 has a maximum orthoradial strain for a given radial force applied on the lamella 32. In this case, and as will be subsequently described, each of the strain sensors 22 is placed in one of the portions of the lamellas 32 likely to have a circumferential strain at least equal to one quarter of a maximum circumferential strain experienced by the lamella 32 during the application of a given radial force on the lamella 32, for example at least equal to the half of a maximum circumferential strain experienced by the lamella 32 during the application of a given radial force on the lamella 32.

Preferably, all of the lamellas 32 of the flatness roller 18 have the same thickness.

All of the lamellas 32 disposed along the same axis parallel to the axis of revolution X-X form a generatrix 40 of the flatness roller 18 (FIG. 4).

For example, the generatrix 40 includes a plurality of areas that follow one another in the direction of the axis of revolution X-X and that are distinguished from one another by a density of slots 30, that is to say a number of slots 30 per unit of length along the generatrix 40. The generatrix 40 thus includes, for example, two peripheral areas 42 separated by an intermediate area 44.

Preferably, in the peripheral areas 42, the distance between successive slots 30 is greater than the distance between successive slots 30 of the intermediate area 44. This gives a greater measurement resolution at the peripheral areas of the sheet 10, that is to say at the edges of the sheet 10, which are areas where the internal stress gradients in the sheet 10 are the highest, and where strains of the sheet 10 are likely to have lower spatial ranges than in an intermediate portion of the sheet 10.

For example, the distance between successive slots of the intermediate area 44 is between 10 mm and 40 mm, preferably between 15 mm and 30 mm. Furthermore, the distance between successive slots within each of the peripheral areas 42 is, for example, between 1 mm and 15 mm, preferably between 3 mm and 10 mm.

The slots of the peripheral areas 42 are, preferably, evenly spaced. Furthermore, the slots of the intermediate area 44 are, preferably, evenly spaced.

Advantageously, the body 20 includes, furthermore, a central recess 46 (FIGS. 2 and 3).

The central recess 46 extends, preferably, along the axis of revolution X-X. In this case, the body 20 includes, advantageously, through openings 48 placing in communication the central recess 46 with each of the cavities 28.

In the case where the body 20 consists of sections, the sections 26 include, at the ends thereof in mutual contact, reciprocal centring means, for example a male portion 50 and a female portion 52 intended to cooperate with one another. Furthermore, the body 20 includes locking means, for example a pin, intended to prevent a relative rotation of the sections about the axis of revolution X-X.

The sensors 22 (FIG. 5) are configured to measure a variable representative of a force exerted on the body 20. Particularly, each sensor 22 is associated with a lamella 32 and configured to measure a variable representative of a force exerted on the corresponding lamella 32.

Each sensor 22 is an optical sensor. More specifically, each sensor 22 is a segment of an optical fibre 54 wherein is inscribed a Bragg grating, so that the sensor 22 is a fibre Bragg grating. The same optical fibre 54 is likely to include a plurality of sensors 22, typically a plurality of tens of sensors 22.

Each sensor 22 is configured to receive, coming from an input-output end 55 of the corresponding optical fibre 54, an optical wave forming an interrogation signal.

Furthermore, each sensor 22 is configured to send, towards the input-output end 55 of the corresponding optical fibre 54, an optical response wave. All of the optical response waves provided by the sensors 22 form the measurement signal of the optical fibre 54.

Each sensor 22 has a respective reflexion wavelength $\lambda$. Such a reflection wavelength $\lambda$, also called "resonance wavelength" or "Bragg wavelength", is defined as the wavelength for which the reflection coefficient of the Bragg grating is maximum. The result is that, for each optical fibre 54, the measurement signal has a spectrum similar to a comb, each peak of the spectrum being associated with a sensor 22 of the optical fibre 54.

At a given reference temperature, when no strain is experienced by the sensor 22, the reflection wavelength of the sensor 22 is called "reflection wavelength at rest" and noted $\lambda_0$.

The reflection wavelengths at rest $\lambda_0$ of the sensors 22 belonging to the same fibre 54 are separated two by two.

Each sensor 22 has a measurement axis, taken as being an axis tangent to the middle of the optical fibre segment forming said sensor 22.

Each sensor 22 is such that a strain along the corresponding measurement axis, that is to say a relative elongation (of mechanical and/or thermal origin) or a relative shortening (of mechanical and/or thermal origin), results in a variation $\delta\lambda$ of the reflection wavelength $\lambda$ of the sensor 22 in relation to the reflection wavelength at rest $\lambda_0$. In this case, each sensor 22 is a strain sensor.

Advantageously, for each optical fibre 54, the smallest distance between the reflection wavelengths at rest $\lambda_0$ of the sensors 22 is strictly greater than the double of the maximum variation $\delta\lambda_{max}$ of reflection wavelength likely to be experienced by each sensor 22.

During operation, in the measurement signal from a given optical fibre 54, each peak is associated with a sensor 22 and is located at a wavelength equal to the sum of the corresponding wavelength at rest $\lambda_0$ and of the variation $\delta\lambda$ resulting from the strain of the sensor 22 along the corresponding measurement axis.

Each optical fibre 54 is housed in a corresponding cavity 28, so that each sensor 22 is attached, for example bonded, to the corresponding lamella 32.

More specifically, the sensor 22 is attached to the inner face 36 of the corresponding lamella 32, at one of the connection portions 38 of the lamella 32.

More specifically, the sensor 22 is attached to the inner face 36 of the corresponding lamella 32, in a portion of the lamella 32 likely to have a circumferential strain at least equal to one quarter of a maximum circumferential strain experienced by the lamella 32 during the application of a given radial force on the lamella 32, for example at least equal to the half of a maximum circumferential strain experienced by the lamella 32 during the application of a given radial force on the lamella 32.

In other terms, for a given radial force on the lamella 32, each point of the lamella 32 is subjected to a given circumferential strain (that is to say a circumferential movement in relation to a situation wherein no force is exerted on said lamella 32). The value of said circumferential strain is maximum for one or more particular points of the lamella 32, and is called "maximum circumferential strain of the lamella". The sensor 22 is attached in a portion of lamella 32 whereof the points, in the same conditions, are subjected to a strain at least equal to the half of the aforementioned maximum strain.

Each lamella 32 is configured to have an orthoradial, that is to say circumferential, strain between 1 and 50 microstrains per newton of radial force applied to the lamella 32.

"Microstrain" means, within the meaning of the present invention, a strain corresponds to a relative elongation, that is to say a movement relating to the sampling length, equal to $1.10^{-6}$.

Furthermore, each lamella 32 is configured to be subjected to an elastic strain for any radial force whereof the value is between 0.1 N and 100 N. In this case, each lamella 32 is configured to have an orthoradial strain between approximately one microstrain and approximately one thousand microstrains, or even between one microstrain and three thousand microstrains in the case of a lamella 32 produced in a high elastic limit steel.

For example, in the case of an escutcheon section cavity 28, the sensor 22 is attached to the lamella 32, away from a plane of symmetry of the lamella 32 containing the axis of revolution X-X.

Furthermore, each sensor 22 is arranged so that the angle between the corresponding measurement axis and a plane orthogonal to the axis of revolution X-X is less than or equal to 20°, for example less than or equal to 10°.

"Angle between the measurement axis and the plane orthogonal to the axis of revolution X-X" means, within the meaning of the present invention, the smallest angle between a direction vector of the measurement axis and a direction vector of a straight line belonging to said plane orthogonal to the axis of revolution X-X.

Preferably, each optical fibre 54 is wound in a circular helix about an axis parallel to the axis of revolution X-X.

Advantageously, each optical fibre 54 is engaged in an associated through opening 48 so that the corresponding input-output end 55 is located in the central recess 46.

Advantageously, each cavity 28 is filled with an elastomer intended to provide the sealing of the cavity 28, in particular to prevent any liquids (water, oil) from penetrating into the cavity 28.

The elastomer is chosen so as to have an elasticity such that, for neighbouring lamellas 32, the effect on the strain of the lamellas 32 that would be caused by cross-talk via the elastomer are negligible with regards to the sensitivity of the sensors 22.

Such an elastomer is, for example, a silicone elastomer.

Each lateral device 23 comprises a flange 56 and a bearing 58.

One at least of the two end devices 23 includes a fibre optic rotary joint 60. Furthermore, one of the two end devices 23 includes an angular coder 62.

Each flange 56 is arranged at one respective end of the body 20 and attached to said end in order to close, preferably hermetically, the body 20.

Each bearing 58 includes a rotor 58A, attached to the flange 56, and a stator 58B, intended to be attached to a frame of the rolling operation line 1, rotatable one in relation to the other about a corresponding axis of rotation. The axis of rotation of each bearing 58 is combined with the axis of revolution X-X of the body 20.

Each fibre optic rotary joint 60, is configured to make possible an uninterrupted circulation of optical waves between the flatness roller 18 and the detection unit 21, whether the flatness roller 18 is in rotation (rolling operation line in operation) or not (rolling operation line stopped).

The fibre optic rotary joint 60 includes an integer M of channels, M being equal to the number of optical fibres to which the fibre optic rotary joint 60 is connected. For example, in FIG. 2, each fibre optic rotary joint 60 includes two channels.

Each channel of the fibre optic rotary joint 60 comprises a first end 60A and a second end 60B.

Each first end 60A of the fibre optic rotary joint 60 is connected to the detection unit 21. More specifically, each first end of the fibre optic rotary joint 60 is connected to an input-output port of a corresponding circulator.

Furthermore, each second end 60B of the fibre optic rotary joint 60 is connected to the input-output end 55 of a corresponding optical fibre 54.

The fibre optic rotary joint 60 is configured to receive the interrogation signal coming from the detection unit 21, and to route the interrogation signal to each optical fibre 54.

Furthermore, the fibre optic rotary joint 60 is configured to receive the measurement signal coming from each optical fibre 54, and to route the measurement signal to the detection unit 21.

Advantageously, the fibre optic rotary joint 60 has an IP64 or IP65 qualification, that is to say giving a total protection against liquid projections regardless of the angle of incidence thereof.

The angular coder 62 is configured to measure an angular position of the flatness roller 18 in relation to a predetermined reference angular position.

The angular coder 62 is connected to the detection unit 21 in order to transmit, to the detection unit 21, the measured angular position of the flatness roller 18.

The angular coder 62 is, advantageously, of absolute, single-revolution type.

The detection unit 21 includes an optical source 64, routing means 65, a spectral analysis module 66 and a computer 68.

The optical source 64 is configured to generate the optical wave forming the interrogation signal of the sensors 22 of each optical fibre 54.

The optical source 64 includes K outputs, K being equal to the sum of the number M of channels of the fibre optic rotary joints 60.

Each output of the optical source 64 is connected to a first corresponding end of the fibre optic rotary joint 60. More specifically, each output of the optical source 64 is connected to an input port of the circulator associated with the first corresponding end of the fibre optic rotary joint 60.

Advantageously, the interrogation signal has a spectral range strictly greater than the largest distance between the reflection wavelengths at rest $\lambda_0$ of the sensors 22.

For example, the optical source 64 is configured to send an interrogation signal centred around 820 nm and having, for example, a spectral range of 30 nm. In said range of wavelengths, the usual sensitivity of the sensors 22 is in the order of 0.65 pm/microstrain. In this case, the smallest distance between the reflection wavelengths at rest $\lambda_0$ of the sensors 22 is, for example, equal to 1.6 nm.

According to one example, the optical source 64 is configured to send an interrogation signal whereof the spectrum is between 1,525 nm and 1,565 nm, or even between 1,525 nm and 1,625 nm, or also between 1,460 nm and 1,625 nm. In said range of wavelengths, the usual sensitivity of the sensors 22 is in the order of 1.2 pm/microstrain. In this case, the smallest distance between the reflection wavelengths at rest $\lambda_0$ of the sensors 22 is, for example, equal to 3 nm.

Alternatively, the optical source 64 is a tunable laser source.

The routing means 65 are connected to the angular coder 62.

The routing means 65 are also optically connected to the fibre optic rotary joint 60. Particularly, the routing means 65 are connected to an output port of each circulator in order to receive the measurement signal coming from each optical fibre 54.

The routing means 65 are also optically connected to the spectral analysis module 66 in order to selectively route, to the spectral analysis module 66, the measurement signals coming from the optical fibres 54 of the same generatrix 40, that is to say the optical fibre or fibres 54 whereof the sensors 22 are attached to the lamellas 32 of the generatrix. More specifically, the routing means 65 are configured to selectively route, to the spectral analysis module 66, the measurement signals coming from the optical fibres 54 of the same generatrix 40 only when the angle measured by the angular coder 62 belongs to a predetermined range associated with said generatrix 40.

Preferably, the predetermined ranges are separated two by two.

The spectral analysis module 66 is configured to analyse, over time, the measurement signal received coming from each optical fibre 54.

Due to the nature of the sensors 22, the analysis by the spectral analysis module 66, at a given moment, of a measurement signal delivered by an optical fibre 54 amounts to a simultaneous analysis of the optical response waves of all of the sensors 22 belonging to the optical fibre 54.

Furthermore, the use of routing means 65 is such that the spectral analysis module 66 is capable of simultaneously analysing, at a given moment, the optical response waves of all of the sensors 22 of a generatrix 40.

Furthermore, the spectral analysis module 66 is configured to deliver an analysis signal representative of the wavelength of each peak in the response signal received coming from each optical fibre 54. In other terms, the analysis signal is representative of the spectrum of the optical response wave of each of the sensors 22 of the generatrix 40.

The spectral analysis module 66 is, for example, a concave grating spectrometer, associated with a photodetector array. In this case, the relative intensity between the electrical signals delivered by the photodetectors is representative of the spectrum of the measurement signal.

The computer 68 is connected to the angular coder 62 for receiving the measured angular position of the flatness roller 18.

Furthermore, the computer 68 is connected to the spectral analysis module 66 for acquiring the analysis signal generated depending on each measurement signal.

The computer 68 is configured to store, for each generatrix 40, an angle $\theta_0$, known as "contact angle", corresponding to a position wherein the generatrix 40 is supposed to be in contact with the sheet 10, during the rotation of the flatness roller 18. In this case, the computer 68 is configured to acquire the analysis signal when the angle measured by the angular coder 62 is equal to the contact angle $\theta_0$. Such a contact angle $\theta_0$ is, for example, shown in FIG. 6B.

For a given generatrix 40, the contact angle $\theta_0$ belongs to the predetermined range associated with the generatrix.

Furthermore, the computer 68 is configured to store, for each optical fibre 54, the reflection wavelength at rest $\lambda_0$ of the corresponding sensors 22.

The computer 68 is also configured to determine, from the analysis signal, the reflection wavelength associated with each peak in the measurement spectrum.

The computer 68 is also configured to associate each determined reflection wavelength with the corresponding sensor 22.

For example, for each optical fibre 54, the computer 68 is configured to associate a measured wavelength with the sensor 22 that has the reflection wavelength at rest $\lambda_0$ the closest to said measured wavelength. Such an association method has a low error rate in the case where the smallest distance between the reflection wavelengths at rest $\lambda_0$ of the sensors 22 is strictly greater than the double of the maximum variation $\delta\lambda_{max}$ of reflection wavelength likely to be experienced by each sensor 22.

Furthermore, the computer 68 is configured to calculate, for each sensor 22, the variation of wavelength $\delta\lambda$ resulting from the strain of the sensor 22 along the corresponding measurement axis, as the difference between the measured wavelength and the reference wavelength:

$$\delta\lambda = \lambda_{m,\theta_0} - \lambda_0$$

where $\lambda_{m,\theta_0}$ is the measured wavelength when the angle measured by the angular coder 62 is equal to the contact angle $\theta_0$.

Furthermore, the computer 68 is configured to calculate the force applied to the lamella 32 associated with a given sensor 22 according to the formula:

$$\delta\sigma = \frac{\delta\lambda}{S} + C$$

where $\delta\sigma$ is the force applied on the lamella 32 (in newton N);

$\delta\lambda$ is the variation of wavelength of the sensor 22 (in pm);

S is the sensitivity of the sensor 22 (in pm/N), determined during a calibration step described subsequently; and C is a detection threshold of the sensor 22 (in N).

The determination of the detection threshold will be subsequently described.

Figure 6A:
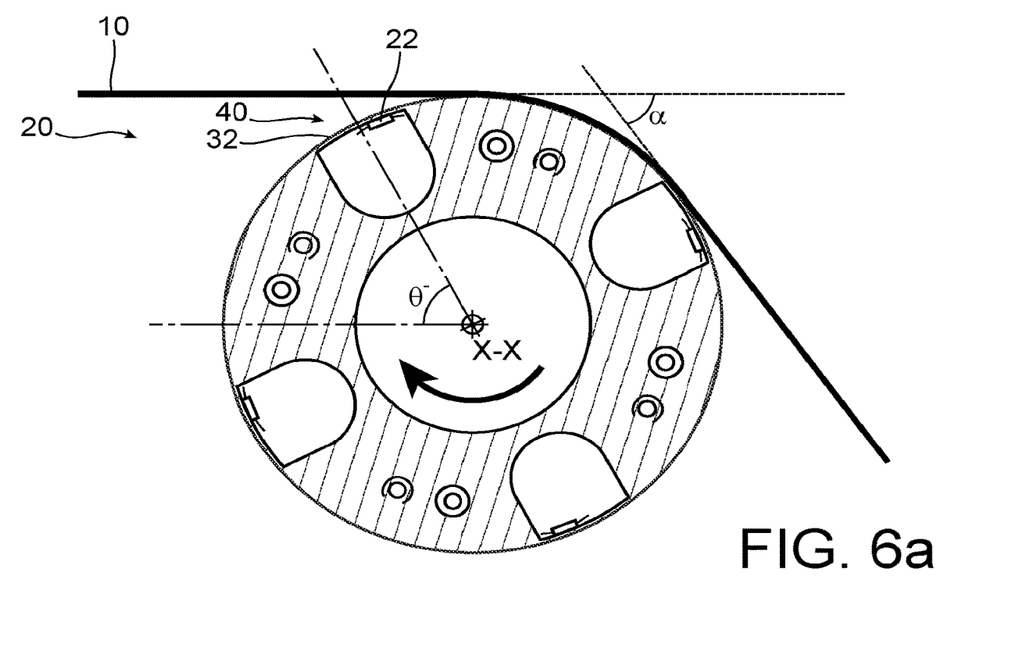
FIGS. 6A, 6B and 6C correspond to the sectional view of FIG. 3 when a generatrix of the flatness roller is located respectively at an angular position equal to a predetermined entry contact angle, a predetermined contact angle and a predetermined exit contact angle.
Figure 6B:
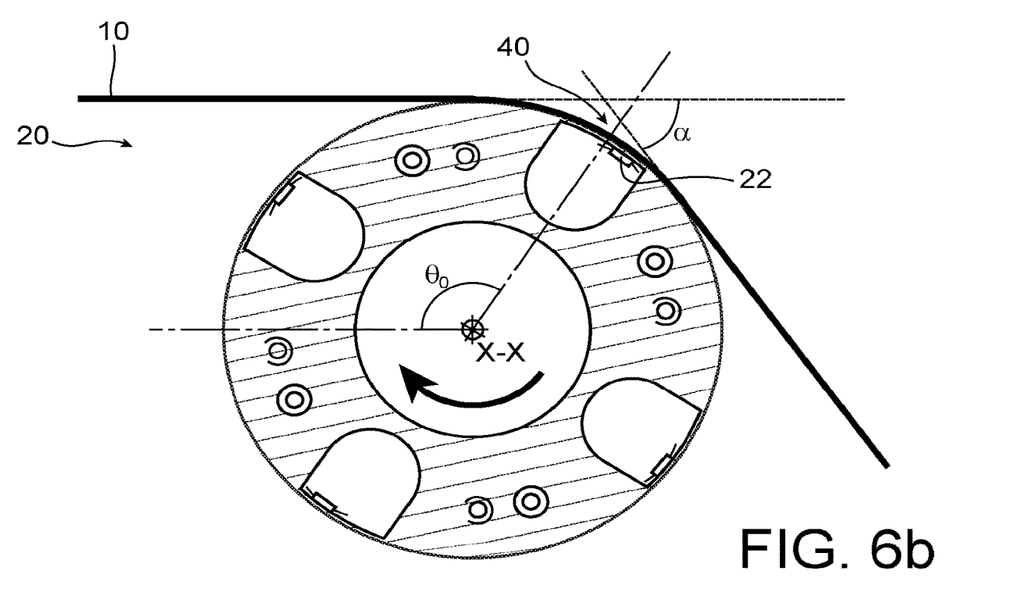

Preferably, the computer 68 is also configured to store, for each generatrix 40, an angle $\theta^-$, known as "entry contact angle", corresponding to a position wherein the generatrix 40 is not yet supposed to be entered into contact with the sheet 10, during the rotation of the flatness roller 18, as illustrated in FIG. 6A. In this FIG. 6A, as well as in FIGS. 6B and 6C, the arrow in arc of a circle shows the direction of rotation of the flatness roller.

Figure 6C:
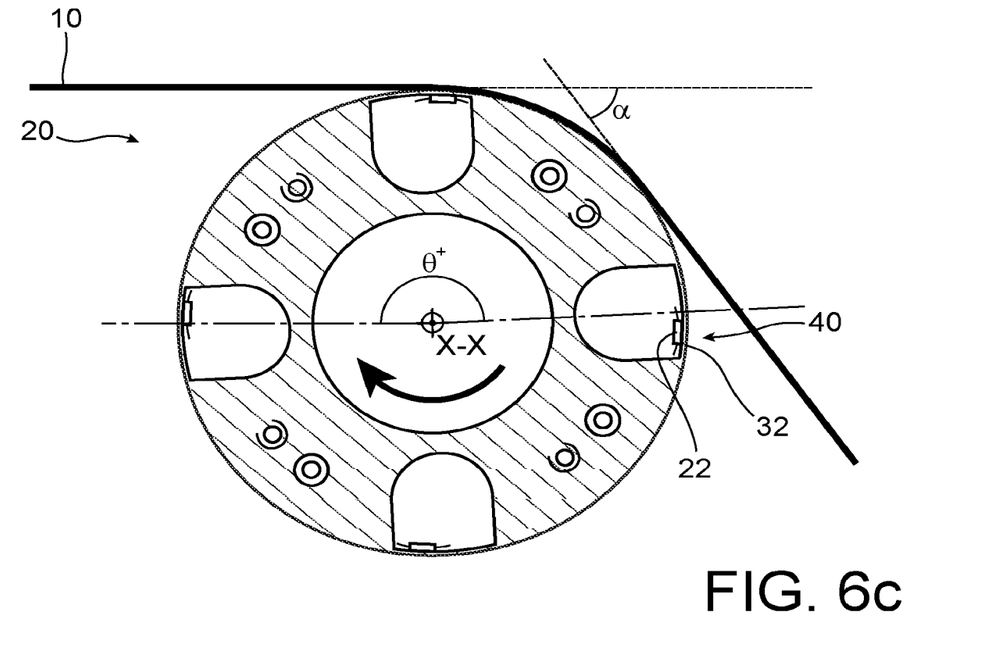

Preferably, the computer 68 is also configured to store, for each generatrix 40, an angle $\theta'$, known as "exit contact angle", corresponding to a position wherein the generatrix 40 is no longer supposed to be in contact with the sheet 10, during the rotation of the flatness roller 18, as illustrated in FIG. 6C.

The entry contact angle $\theta^-$ and the exit contact angle $\theta^+$ are such that the contact angle $\theta_0$ is between the entry contact angle $\theta^-$ and the exit contact angle $\theta^+$. This is apparent, for example, in FIGS. 6A to 6C.

Furthermore, for a given generatrix 40, the entry contact angle $\theta^-$ and the exit contact angle $\theta^+$ belong to the predetermined range associated with the generatrix.

In this case, the computer 68 is also configured to acquire the analysis signal when the angle measured by the angular coder 62 is equal to the entry contact angle $\theta^-$ and to the exit contact angle $\theta^+$, and to associate each wavelength measured by the spectral analysis module 66 with the corresponding sensor 22.

Furthermore, the computer 68 is configured to calculate, for each sensor 22, the variation of length $\delta\lambda$ resulting from the strain of the sensor 22 along the corresponding measurement axis and corrected with effects of the temperature, according to the following formula:

$$\delta\lambda = \lambda_{m,\theta_0} - \frac{\lambda_{m,\theta^-} + \lambda_{m,\theta^+}}{2}$$

where $\lambda_{m,\theta^-}$ is the measured wavelength when the angle measured by the angular coder 62 is equal to the entry contact angle $\theta^-$; and $\lambda_{m,\theta^+}$ is the measured wavelength when the angle measured by the angular coder 62 is equal to the exit contact angle $\theta^+$.

For a given generatrix 40, the calculated force profile constitutes the flatness vector.

The computer 68 is also configured to compare each flatness vector with a target profile.

Advantageously, the computer 68 is also configured to generate, depending on the difference between the flatness vector and the target profile, instructions for controlling nozzles 14 and/or actuators 16.

The operation of the system for measuring flatness 19 will now be described.

During an initialisation step, for each optical fibre 54, the value of the reflection wavelength at rest $\lambda_0$ of each sensor 22 of the optical fibre 54 is saved in the processing unit 21.

Furthermore, for each generatrix 40, the value of the contact angle $\theta_0$ and, advantageously, the value of the entry contact angle $\theta^-$ and of the exit contact angle $\theta^+$ are saved in the processing unit 21.

During a calibration step, a predetermined force is applied on the outer face 34 of each lamella 32.

The variation of the reflection wavelength of each sensor 22 depending on the force measured, and a model connecting said variation of the reflection wavelength to the force applied to the lamella is determined. Then, the determined model is saved in the processing unit 21. Such a model is, for example, the refined model previously described:

$$\delta\sigma = \frac{\delta\lambda}{S} + C$$

In the case where the values of the parameters of the model vary with the sensor 22, the values of the determined model for each sensor 22 are saved in the processing unit 21 in relation with the corresponding sensor 22.

Then the flatness roller 18 is inserted into the rolling operation line 1.

The sheet 10 drives the flatness roller 18 in rotation.

The angular coder 62 measures the angular position of the flatness roller 18.

The optical source 64 generates the interrogation signal, and the fibre optic rotary joint 60 routes the interrogation signal to each optical fibre 54.

Each optical fibre 54 sends back, to the spectral analysis module 66, the corresponding measurement signal.

When the angle measured by the angular coder 62 belongs to a predetermined range associated with a given generatrix 40, the routing means 65 transmit, to the spectral analysis module 66, the measurement signals from the optical fibres 54 of said generatrix 40.

For said generatrix 40, the spectral analysis module 66 analyses, over time, the measurement signal received coming from each corresponding optical fibre 54. Furthermore, the spectral analysis module 66 delivers, over time, the analysis signal representative of the wavelength of each peak in the response signal received coming from each optical fibre 54.

For the contact angle $\theta_0$ associated with the generatrix 40, the computer 68 acquires the analysis signal. Advantageously, the computer 68 also acquires the analysis signal for the entry contact angle $\theta^-$ and for the exit contact angle $\theta^+$ associated with the generatrix 40.

Then, the computer 68 determines the current reflection wavelength for each sensor 22.

Then, the computer 68 calculates, for each sensor 22, the variation of reflection wavelength $\delta\lambda$ associated to the current reflection wavelength $\lambda$ determined, that is to say the difference between the current reflection wavelength $\lambda$ determined and the reflection wavelength at rest $\lambda_0$.

Then, for each sensor 22, the computer 68 determines, from the variation of reflection wavelength $\delta\lambda$ calculated, the force applied to the lamella 32 associated with the sensor 22. The vector formed by the force applied to each of the lamellas 32 of the generatrix 40 forms the flatness vector associated with the generatrix 40.

Then, the computer 68 compares the flatness vector with the target profile.

Then, the computer 68 generates, depending on the differences between the flatness vector and the target profile, instructions for controlling nozzles 14 and/or actuators 16.

The operations implemented by the spectral analysis module 66 and the computer 68, described previously, are repeated whenever the angle measured by the angular coder 62 belongs to the predetermined range associated with a new generatrix 40.

Figure 7:
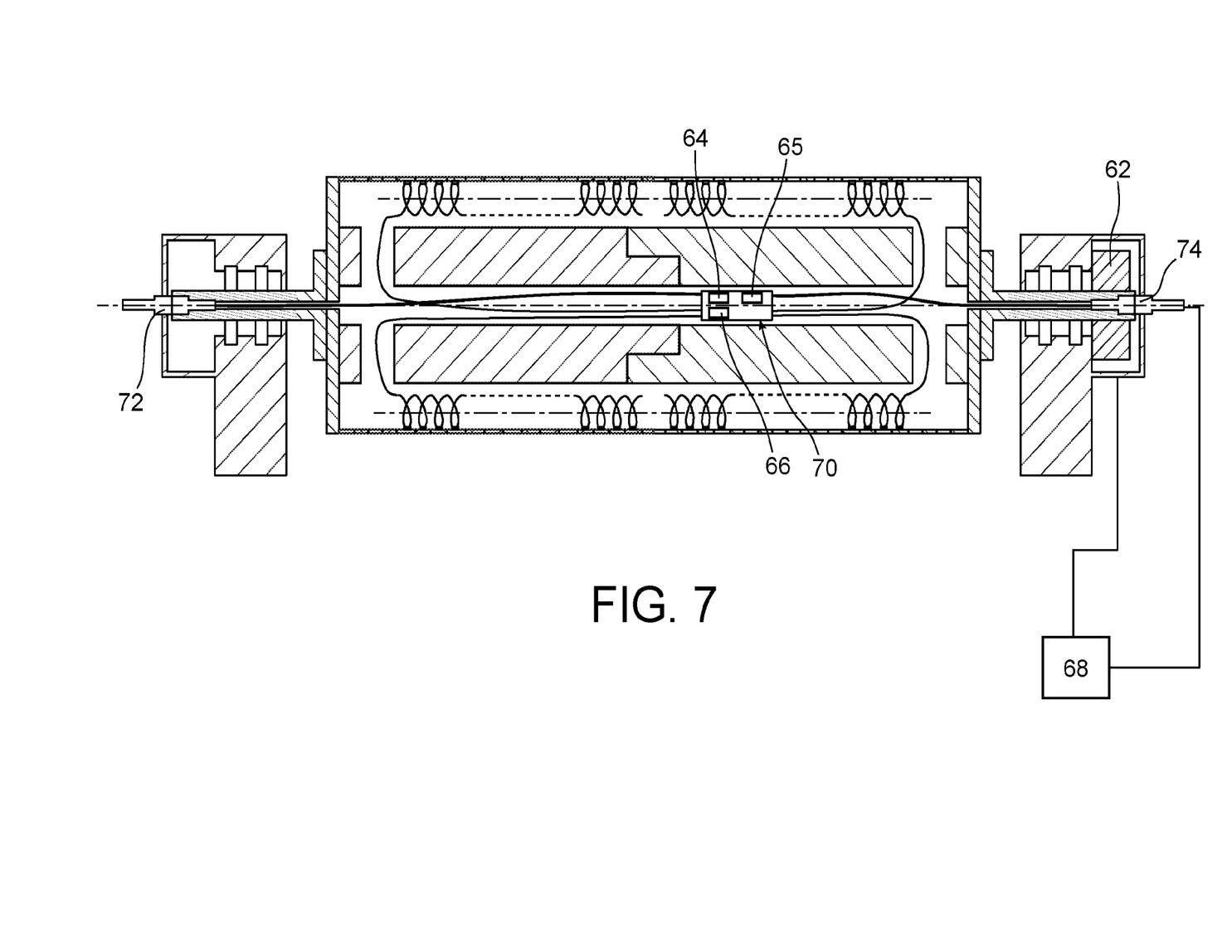
FIG. 7 is a schematic representation of a second embodiment of a system for measuring flatness according to the invention, a flatness roller of the system for measuring flatness being shown in a sectional view along a plane containing an axis of revolution of the flatness roller.

A second embodiment of the system for measuring flatness 19 according to the invention is illustrated in FIG. 7.

The system for measuring flatness 19 of FIG. 7 differs from the system for measuring flatness 19 of FIG. 2 only in that same is devoid of fibre optic rotary joint.

In this case, the optical source 64, the routing means 65 and the spectral analysis module 66 are arranged in the central recess 46 of the flatness roller 18 to form a Bragg interrogation assembly 70.

The flatness roller 18 also includes a supply rotary joint 72, configured to provide the transport of electrical energy to the Bragg interrogation assembly 70 from an external electrical energy source to the flatness roller 18.

The flatness roller 18 includes, furthermore, a communication rotary joint 74, configured to provide a communication between the Bragg interrogation assembly 70 and the computer 68, in particular to provide the transport of the analysis signal from the spectral analysis module 66 to the computer 68.

For example, the communication rotary joint 74 is an Ethernet rotary joint.

Figure 8:
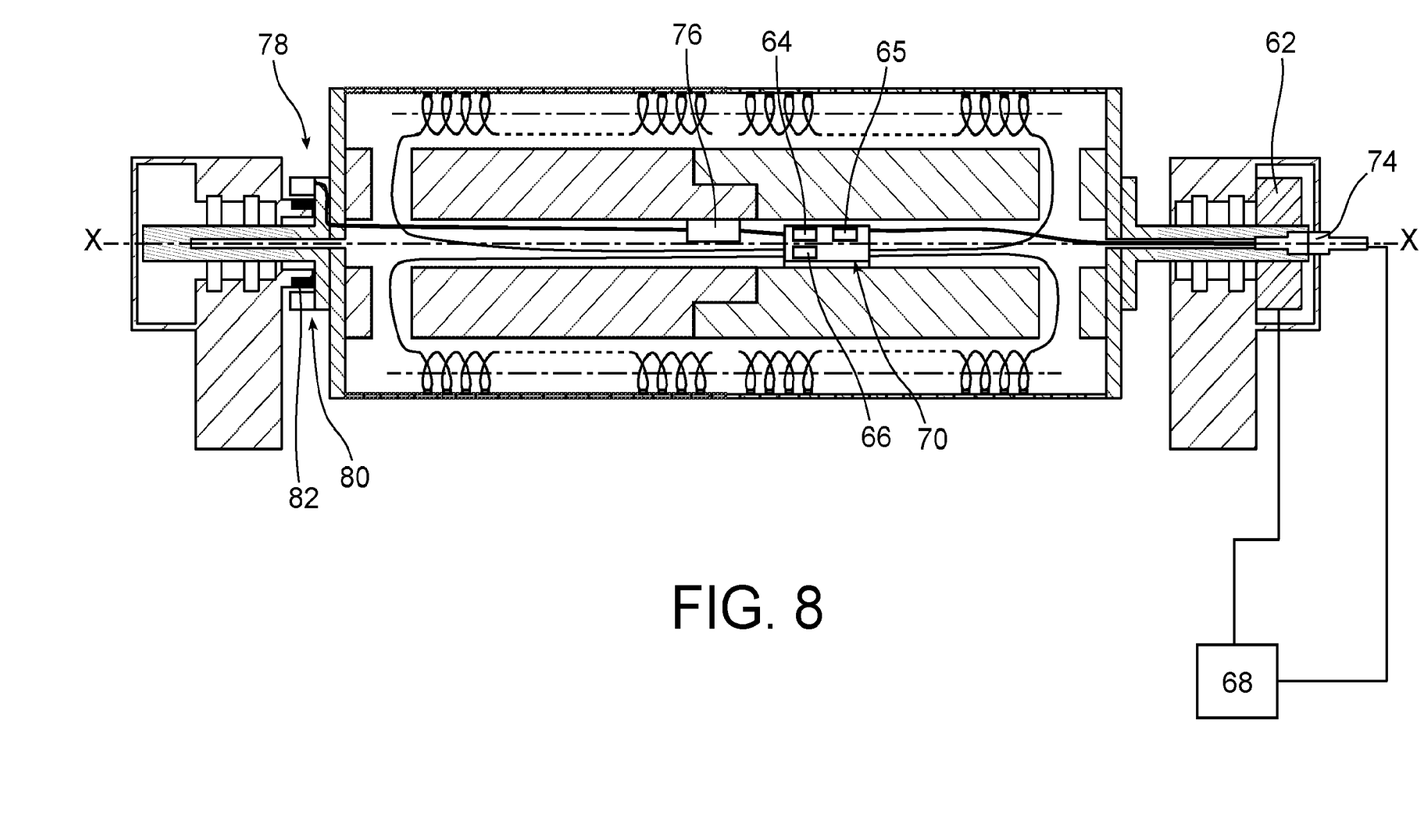
FIG. 8 is a schematic representation of a third embodiment of a system for measuring flatness according to the invention, a flatness roller of the system for measuring flatness being shown in section along a plane containing an axis of revolution of the flatness roller.

A third embodiment of the system for measuring flatness 19 according to the invention is illustrated in FIG. 8.

The system for measuring flatness 19 of FIG. 8 differs from the system for measuring flatness 19 of FIG. 7 only in that the flatness roller 18 is devoid of fibre optic rotary joint. In this case, a battery 76, shown schematically in FIG. 8, is arranged in the central recess 46 to supply the Bragg interrogation assembly 70 with electrical energy.

Advantageously, one of the end devices 23 of the flatness roller 18 includes an alternator 78, electrically connected to the battery 76.

The alternator 78 is configured to convert a portion of the mechanical energy coming from the rotation of the flatness roller 18 into electrical energy in order to recharge the battery 76.

For example, the alternator 78 comprises an armature 80, integral with the body 20, and an inductor 82, intended to be attached to the frame receiving the flatness roller 18. The armature is configured to rotate, relatively to the inductor, about the axis of revolution X-X.

The inductor 82 comprises, for example, a plurality of permanent magnets. Furthermore, the armature 80 includes, for example, a plurality of coils disposed in the magnetic field generated by the magnets of the inductor.

According to one variant of the systems for measuring flatness 19 in FIG. 7 or 8, the spectral analysis module 66 is external to the flatness roller 18. In this case, the flatness roller 18 includes a fibre optic rotary joint that is only intended to route the response signals from the optical fibres 54 to the external spectral analysis module 66. Furthermore, in this case, the flatness roller 18 is devoid of communication rotary joint.

According to one variant of the systems for measuring flatness 19 in FIG. 7 or 8, the flatness roller 18 is devoid of communication rotary joint. In this case, the flatness roller 18 includes an electromagnetic wave transmitter, configured to send, to the computer 68, electromagnetic waves coded by the analysis signal delivered by the spectral analysis module 66.

The computer 68 is configured to receive the electromagnetic waves sent by the electromagnetic wave transmitter and to decode said electromagnetic waves in order to determine the reflection wavelength of each sensor 22.

Furthermore, the flatness roller 18 includes at least one transparent portion in the transmission frequency range of the electromagnetic wave transmitter to make it possible to propagate electromagnetic waves from the electromagnetic wave transmitter to the computer 68.

For example, the electromagnetic wave transmitter is a Wi-Fi transmitter module (standard IEEE 802.11). For example, the transparent portion is a window provided in one of the flanges 56 of the flatness roller 18. For example, the window is made of poly(methyl methacrylate) (PMMA), of polycarbonate (PC) or of glass fibre reinforced plastics.

More generally, the flatness roller 18 includes at least one transparent portion, the transparent portion being suitable for transmitting at least partially one electromagnetic wave belonging to a predetermined range of frequencies, for example belonging to microwaves, to optical waves, to the near ultraviolet spectrum or to the near infrared spectrum.

In this case, the computer 68 is likely to be arranged in the central recess 46, so that the electromagnetic wave transmitter is used to directly transmit the instructions for controlling nozzles 14 and/or actuators 16 generated by the computer 68.

The presence of slots 30 prevents the appearance of cross-talk along each generatrix 40.

"Cross-talk" means, within the meaning of the present application, the appearance of axial stresses along a generatrix when a radial stress is applied on the flatness roller 18. In other terms, in the case of cross-talk, a stress applied in a given point of the generatrix 40 results in the appearance of a stress in neighbouring points, in particular neighbouring points belonging to the generatrix, even in the absence of radial force exerted on said points.

Such cross-talk generally requires complicated calculations in order to be compensated. Furthermore, the results obtained after such calculations do not generally have sufficient accuracy. This results in a degradation of the performances of the control loop.

The presence of slots 30 substantially reduces the propagation of axial forces along the generatrix 40. Such calculations are no longer necessary, and the performances of the control loop are improved.

The fact that the measurement axis of each sensor 22 forms, with any plane orthogonal to the axis of revolution X-X, an angle less than or equal to 10', leads to that each sensor 22 measures only or essentially a circumferential, that is orthoradial, component of the strain of the corresponding lamella 32. Yet, the applicant noted that, during the application of a radial force on a lamella 32, the circumferential component of the strain of the lamella 32 is the strain having, in absolute value, the greatest amplitude. As a result, such an arrangement of the measurement axes of the sensors 22 maximises the amplitude of the elongation of the sensors 22, and therefore maximises the sensitivity of the flatness roller 18.

The use of such fibre Bragg grating sensors 22 is advantageous, insofar as the sensitivity thereof, that is to say the amplitude of the response thereof, for an interrogation signal of constant amplitude, is independent of the temperature in the usual temperature ranges in the field of rolling, particularly cold rolling.

The use of such optical sensors 22 is advantageous, particularly in a metallurgical environment, for example steelmaking, seat of electromagnetic disturbances generated by the presence of induction furnaces and rotary machines, insofar as such sensors are insensitive to such electromagnetic disturbances.

Furthermore, the use of such sensors 22 in combination with the lamellas 32 gives the flatness roller 18 a significant sensitivity, a significant dynamic and a significant robustness. Indeed, during operation, the body 20 supports most of the force exerted by the sheet 10 on the flatness roller 18. Furthermore, such sensors 22 are likely to be subjected to a wide range of forces, in the order of three magnitudes, without risk of destruction. Furthermore, such sensors, even when same are subjected to a significant average force (for example 2,000 N), are likely to detect minute variations of force (for example 2 N).

The use of such optical sensors 22 is also advantageous, insofar as the wavelength multiplexing on the same optical fibre 54 allows a simultaneous analysis of the optical response waves of each sensor 22. The measurement is then synchronous on a generatrix, eliminating the measurement biases related to out of balance phenomena, coil-winding machine eccentricities, etc. The result thereof is a substantial gain in measurement accuracy comparatively to the devices of the prior art with electromagnetic sensors, which generally require a sequential acquisition and therefore do not provide a true synchronous measurement.

Such a simultaneous acquisition is also advantageous insofar as a sequential acquisition of the sensors, during the rotation of the flatness roller 18, is likely to hide potential biases related to any periodic fluctuations of force at the rolling mill stand 4.

The use of such sensors 22 is also advantageous insofar as the cost thereof is generally lower than the cost of the usual electromagnetic sensors.

The use of such optical sensors 22 is also advantageous insofar as the small dimensions thereof allow the production of lamellas 32 of small axial range, which increases the spatial resolution of the system for measuring flatness 19 along each generatrix 40. This is particularly advantageous in the field of the rolling of thin sheets, where the axial resolution (that is to say the resolution according to the axis of revolution of the flatness roller 18) required is in the order of a few millimetres, in particular at the lateral edges of the sheet 10, that is to say the edges intended to exert a force on the peripheral areas 42 of each generatrix 40.

Moreover, the use of a body 20 consisting of a plurality of sections 26A, 26B allows a simpler installation of the optical fibres 54, insofar as each section 26A, 26B is likely to be equipped with the corresponding optical fibres 54, before the assembly of the body 20. Indeed, due to the dimensions of the body 20, the installation of the optical fibres 54 in a one-piece body 20 is likely to pose difficulties.

The use of a body 20 consisting of a plurality of sections 26A, 26B also facilitates the repairs of the flatness roller 18, insofar as only the section corresponding to a defective area of the flatness roller 18 is replaced, and not the flatness roller in the entirety thereof.

The presence of solid portions 29 in the body 20 provides a transfer of the forces exerted by the sheet 10, which gives the body 20 a greater rigidity than the devices of the prior art.

Furthermore, the body 20 being metal, the arrangement of all or part of the components of the processing unit 21 (of which the optical source 64, the spectral analysis module 66 or the computer 68) in the body 20 gives the body 20 a function of protection against the electromagnetic disturbances, known as "electromagnetic shielding". Such a protection is particularly advantageous in a metallurgical environment, for example steelmaking, seat of electromagnetic disturbances generated by the presence of induction furnaces and rotary machines.

The invention claimed is:

1. A flatness roller comprising:
    a body of cylindrical shape extending along an axis of revolution and radially delimited by an outer surface,
    wherein the body includes at least one cavity extending parallel to the axis of revolution,
    each cavity opening radially onto the outer surface through a plurality of slots each extending in a respective plane orthogonal to the axis of revolution,
    each slot having two circumferential slot ends,
    two successive slots among the plurality of slots and along an axis parallel to the axis of revolution define a lamella therebetween, each lamella being delimited by the circumferential slot ends of the two successive slots,
    each lamella being connected to the body by two opposite circumferential ends of each lamella, each circumferential end of each lamella forming a connection portion,
    the body having one or more generatrix, each generatrix being formed by lamellas aligned in a direction parallel to the axis of revolution,
    the flatness roller further including at least one optical fibre comprising at least one strain sensor, each strain sensor having a measurement axis, each strain sensor being associated with one of the lamellas,
    each strain sensor being housed in a corresponding cavity of the least one cavity and attached to the associated lamella at one of the connection portions of each lamella,
    each strain sensor being arranged so that an angle between a corresponding one of the measurement axes and a plane orthogonal to the axis of revolution is less than or equal to 20°, and
    each optical fibre being configured to receive an interrogation signal, each strain sensor of each optical fibre being configured to send, depending on the interrogation signal received by each optical fibre, an optical response wave representative of a strain of the strain sensor along the corresponding measurement axis.

2. The flatness roller according to claim 1, wherein at least one of the lamellas has a constant thickness.

3. The flatness roller according to claim 1, wherein at least one cavity of the at least one cavity has, in a plane orthogonal to the axis of revolution, a circular cross-section.

4. The flatness roller according to claim 1, wherein each lamella is configured to have a circumferential strain between 1 and 50 microstrains per newton of radial force applied to each lamella.

5. The flatness roller according to claim 1, wherein each generatrix has a variable density of slots, the density of slots in at least one peripheral area of each generatrix being greater than the density of slots in an intermediate area of each generatrix.

6. The flatness roller according to claim 1, wherein the body is formed by a plurality of sections arranged axially end to end, each section being associated with at least one of the optical fibres wherein corresponding ones of the strain sensors are attached to corresponding ones of the lamellas of each section.

7. The flatness roller according to claim 1, wherein the body includes at least one solid portion arranged radially inwardly in relation to at least one of the at least one cavity and/or circumferentially between two of the at least one cavity.

8. The flatness roller according to claim 1, wherein each cavity is filled with an elastomer arranged to provide a sealing of each cavity.

9. The flatness roller according to claim 1, wherein each strain sensor is a fibre Bragg grating.

10. The flatness roller according to claim 1, wherein the at least one cavity presents an escutcheon cross-section.

11. A system for measuring flatness including a detection unit and a flatness roller according to claim 1,
    the detection unit being configured to send the interrogation signal to each optical fibre and to receive, from each optical fibre, a measurement signal formed by the optical response waves generated by the strain sensors of each optical fibre,
    the detection unit being further configured to measure an angle of rotation of the body in relation to a reference position, each generatrix being associated with a contact angle,
    the detection unit being configured to acquire the measurement signal coming from each optical fibre when the angle of rotation of the body is equal to the contact angle,
    the detection unit being further configured to calculate a flatness vector depending on each acquired measurement signal.

12. The system for measuring flatness according to claim 11, wherein each generatrix is also associated with an entry contact angle and an exit contact angle, the contact angle being between the entry contact angle and the exit contact angle, the detection unit being configured to acquire the measurement signal coming from each optical fibre when the angle of rotation of the body is equal to each of the entry contact angle and the exit contact angle, the detection unit being further configured to implement the measurement signal acquired for each of the entry contact angle, the contact angle and the exit contact angle in order to calculate a flatness vector corrected with effects of the temperature on the lamellas of each generatrix during the rotation of the body between the corresponding entry contact angle and the exit contact angle.

13. The system for measuring flatness according to claim 11, wherein the body of the flatness roller is metal and includes a central recess, a processing unit being at least partially housed in the central recess.

14. A rolling operation line including a system for measuring flatness according to claim 11.

* * * * *